D. L. COLUMBIA.
Scale-Beam.

No. 196,519. Patented Oct. 30, 1877.

Witnesses
O. W. Bond
H. F. Brunes

Inventor
Dana L. Columbia
Per Shrh W Bond Attorneys

UNITED STATES PATENT OFFICE.

DANA L. COLUMBIA, OF CHICAGO, ILLINOIS.

IMPROVEMENT IN SCALE-BEAMS.

Specification forming part of Letters Patent No. 196,519, dated October 30, 1877; application filed July 27, 1876.

*To all whom it may concern:*

Be it known that I, DANA L. COLUMBIA, of the city of Chicago, Cook county, State of Illinois, have invented a new and useful Improvement in Scale-Beams, of which the following is a full description, reference being had to the accompanying drawings, in which—

Figure 1:
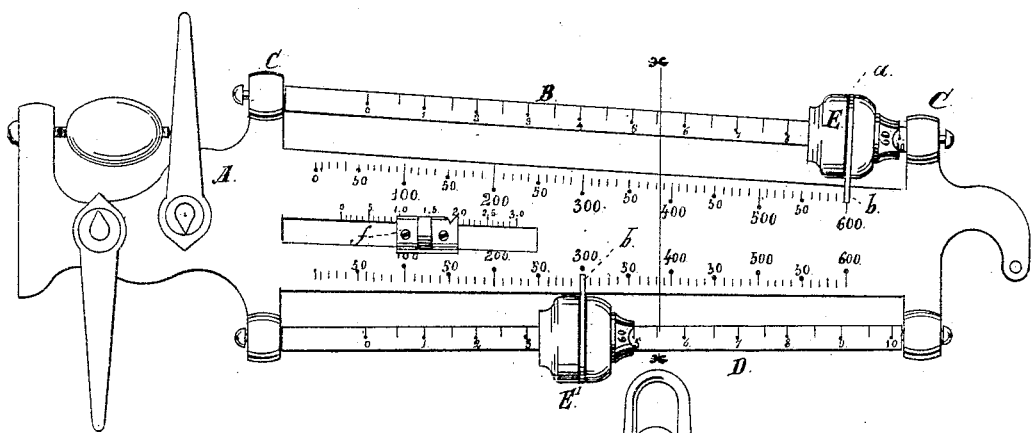
Figure 3:
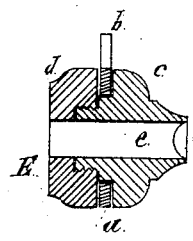
Figure 2:
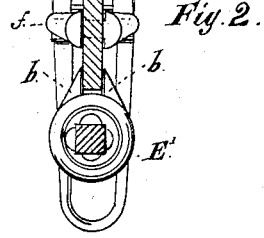

Figure 1 is a side elevation; Fig. 2, a section at $x\ x$, Fig. 1, looking to the left; Fig. 3, a vertical section of the poise.

My invention consists in combining with the ordinary scale-beam, graduated to indicate pounds, one or more secondary beams, graduated to indicate quantity in bushels or other denominations, such secondary beam carrying a poise of peculiar construction.

In the drawings, A represents a scale-beam, constructed in the usual manner, and graduated to indicate pounds. B is a secondary or auxiliary beam, graduated to indicate quantity in bushels. C are arms upon the beam A, in which B is pivoted. As represented, B is four-sided, but may have more or less sides, each side having a different graduation—as, for example, one for wheat, another for corn, and another for oats. D is another auxiliary beam, in all respects similar to B. E is a poise. $a$ is a collar in which the poise rotates. $b$ are points on this collar $a$, extending down over the main beam A, to prevent the collar from turning. These points $b$ form, also, the index of the poise. $c\ d$ are the two parts of which the body of the poise is composed, having a hole through them corresponding with the size and form of the auxiliary beam, which should be angular. As represented, these parts $c\ d$ are screwed one upon the other, with a space between them to receive the collar $a$. E' is a second poise on the beam D. $f$ is a secondary poise, located in the beam A for the purpose of indicating a small number of pounds—a number less than the unit of measure.

The point of the poise E is provided with figures to indicate the number of pounds in a unit of any desired measure. As represented, 60 is in view, and that side of the beam B in view is graduated to indicate bushels of wheat at sixty pounds to the bushel. The same is the case with the other poise on the beam D.

As represented, the beams B and D are graduated so that the small end of the poise indicates the number of bushels or other unity of measure, while the points $b$ indicate the number of pounds.

The upper poise, as shown, is located so that the index $b$ indicates 600 pounds, and the end of the poise indicates 10, or the number of bushels contained in six hundred pounds of wheat, while the lower poise is placed so that the index $b$ indicates 300 pounds, and the small end of the poise indicates 5, or the number of bushels in three hundred pounds of wheat.

By turning the beam B the other sides can be brought to view, as may be desired, and each side is properly graduated to indicate the number of bushels of the article for which it is designed which are contained in the number of pounds indicated on the main beam A. The fractional parts of a bushel can be indicated by the small poise $f$.

What I claim as new, and desire to secure by Letters Patent, is as follows:

1. The revolving and sliding poise E, in combination with the non-rotating index $b$, and beam A, and rotating beam B, substantially as and for the purpose described.

2. The poise E, arranged to revolve with the beam B, and to show the unit of whichever scale is brought into use, substantially as set forth.

3. The combination of the beam A, pivoted beams B D, revolving poise E E', and sliding poise $f$, all combined and arranged to operate in the same vertical plane, substantially as described.

DANA L. COLUMBIA.

Witnesses:
 E. A. WEST,
 O. W. BOND.